United States Patent
Yseboodt et al.

(10) Patent No.: US 10,412,799 B2
(45) Date of Patent: Sep. 10, 2019

(54) POWERED DEVICE AND POWER DISTRIBUTION SYSTEM COMPRISING THE POWERED DEVICE

(71) Applicant: SIGNIFY HOLDING B.V., Eindhoven (NL)

(72) Inventors: Leenart Yseboodt, Eindhoven (NL); Matthias Wendt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 173 days.

(21) Appl. No.: 15/324,716

(22) PCT Filed: Jul. 2, 2015

(86) PCT No.: PCT/EP2015/065053
§ 371 (c)(1),
(2) Date: Jan. 8, 2017

(87) PCT Pub. No.: WO2016/005256
PCT Pub. Date: Jan. 14, 2016

(65) Prior Publication Data
US 2017/0208658 A1    Jul. 20, 2017

Related U.S. Application Data

(60) Provisional application No. 62/024,132, filed on Jul. 14, 2014, provisional application No. 62/023,311, (Continued)

(30) Foreign Application Priority Data

Sep. 25, 2014    (EP) ..................... 14186335

(51) Int. Cl.
*G06F 1/26* (2006.01)
*H05B 33/08* (2006.01)
(Continued)

(52) U.S. Cl.
CPC ......... *H05B 33/0842* (2013.01); *H04L 12/10* (2013.01); *H04L 12/6418* (2013.01);
(Continued)

(58) Field of Classification Search
USPC ...................................... 361/18, 90
See application file for complete search history.

(56) References Cited

U.S. PATENT DOCUMENTS 7,516,340 B2    4/2009  Landry et al.
2008/0062586 A1*  3/2008  Apfel ................. H04L 12/10
                                              361/18
(Continued)

FOREIGN PATENT DOCUMENTS

DE    102012106995 B3    1/2014

OTHER PUBLICATIONS

L. Yseboodt, et al., "Extended Power Ps82.3bt", Philips Research, Jul. 3, 2014, 14 pages.

*Primary Examiner* — Danny Nguyen
(74) *Attorney, Agent, or Firm* — Meenakshy Chakravorty

(57) ABSTRACT

Powered devices for use in a power distribution system are provided. The power distribution system may comprise a power providing device for providing power at an output voltage to the powered device over an output interface, and an electrical conductor for transmitting the power between the power providing device and the powered device. The powered device may be assigned to a power class corresponding to a predetermined first power limit and a predetermined second power limit. The predetermined first power limit may relate to a maximum power that the powered device may consume, and the predetermined second power limit may relate to the maximum power that the power providing device may provide.

11 Claims, 7 Drawing Sheets

Related U.S. Application Data filed on Jul. 11, 2014, provisional application No. 62/021,783, filed on Jul. 8, 2014.

(51) Int. Cl.
*H04L 12/10* (2006.01)
*H05B 37/02* (2006.01)
*H04L 12/64* (2006.01)

(52) U.S. Cl.
CPC ..... *H05B 33/0815* (2013.01); *H05B 37/0254* (2013.01); *H05B 37/0263* (2013.01); *G06F 1/26* (2013.01); *H05B 37/0272* (2013.01)

(56) References Cited

U.S. PATENT DOCUMENTS

| | | | |
|---|---|---|---|
| 2008/0164884 A1* | 7/2008 | Hussain | H04L 12/10 324/522 |
| 2009/0121548 A1 | 5/2009 | Schindler et al. | |
| 2012/0223650 A1 | 9/2012 | Radermacher | |
| 2015/0372826 A1* | 12/2015 | Blaut | H04L 12/10 307/1 |

* cited by examiner

POWERED DEVICE AND POWER DISTRIBUTION SYSTEM COMPRISING THE POWERED DEVICE

CROSS-REFERENCE TO PRIOR APPLICATIONS

This application is the U.S. National Phase application under 35 U.S.C. § 371 of International Application No. PCT/EP2015/065053, filed on Jul. 2, 2015, which claims the benefit of European Patent Application No. 14186335.7, filed on Sep. 25, 2014, U.S. Patent Applications Nos. 62/024,132, filed on Jul. 14, 2014, 62/023,311, filed on Jul. 11, 2014 and 62/021,783, filed on Jul. 8, 2014. These applications are hereby incorporated by reference herein.

FIELD OF THE INVENTION

The present invention relates to a powered device for being used in a power distribution system, the system comprising a power providing device for providing a power to the powered device and an electrical conductor connected to the power providing device and the powered device for transmitting the power between the power providing device and the powered device. The present invention further relates to a power distribution system comprising the powered device, and to a method and computer program for providing an electrical load power to an electrical load of the powered device.

BACKGROUND OF THE INVENTION

In Power-over-Ethernet (PoE) system in accordance with the PoE standard IEEE 802.3af or IEEE 802.3at and/or related standards, a power providing device (power providing equipment; PSE) provides a power to one or several powered devices (PD) via one or several electrical conductors (Ethernet cables). The power providing device is, e.g., a switch and the powered devices are, e.g., security cameras, wireless access points, VoIP telephones, etc. In accordance with the standard, the power consumption of a powered device is limited to a power level which is smaller than the power level that can be provided by the power providing device. This difference between maximum power consumed by the powered device and maximum power provided by the power providing device compensates for possible losses in the Ethernet cables. As such, cables of various qualities and lengths can be used within the ranges permitted by the standard and a compliant PD can be used with any compliant cable to connect to any compliant PSE.

SUMMARY OF THE INVENTION

It is an object of the present invention to provide a powered device for being used in a power distribution system, such as a PoE system, which can have increased power consumption. It is a further object of the present invention to provide a power distribution system comprising the powered device, and a method and computer program for providing an electrical load power to an electrical load of the powered device.

In a first aspect of the present invention, a powered device for being used in a power distribution system is presented. The power distribution system comprises a power providing device, for providing to the powered device over a power output interface a power at an output voltage, and an electrical conductor for transmitting the power between the power providing device and the powered device. The voltage at which the power is provided by the power providing device is unknown to the powered device. The PoE standard, as an example, prescribes a voltage within a voltage range (50 Volts to 57 Volts for a PSE type 2). The PoE standard also specifies a minimum power that needs to be provided. As the resistance of the electrical conductor (e.g. Ethernet cable) is unknown, the voltage at the end of the cable on the side of the powered device will vary from the voltage provided at the end of the cable on the side of the power providing device. The resistance of the cable is determined by, for example, the length of the cable (e.g. up to 100 meters for an Ethernet cable based on the data channel specifications), the quality of the cable (e.g. an American Wire Gauge (AWG) 22 versus an AWG 26 cable) and the resistance of the connector used.

The powered device comprises a power input interface, for receiving the power, an electrical load, and an electrical load power providing unit. The electrical load power providing unit transforms the power received over the power input interface into an electrical load power and provides the electrical load power to the electrical load. The electrical load power providing unit is arranged for determining a power control value based on a characteristic of the power provided over the power output interface by the power providing device of the power distribution system. The electrical load power providing unit is further arranged to control the power level of the electrical load power based on the power control value. The power control value can be the voltage of the power provided by the power providing device over the power output interface. The powered device can then control the power level of the electrical load power in order to, for example, have the power providing device operate in an efficient range, avoid drawing too much power from the power providing device, avoid an overload mechanism at the power providing device from being triggered, draw the maximum amount of power that can be provided by the power providing device, etc.

In an embodiment of the powered device, the powered device is arranged to avoid the occurrence of an overload condition at the power providing device. The power providing device of the power distribution system is arranged for monitoring the power provided over the power output interface for occurrence of an overload condition. Such an overload condition can occur when a current above a threshold is drawn. The threshold can be fixed (e.g. an overload condition occurs whenever more than 600 mA are drawn) or can depend on the voltage injected by the power providing device (i.e. a power limit is defined; when, for example, the power limit is 30 Watts and the voltage injected is 56V, then the overload condition can occur when more than 535 mA are drawn while if the voltage injected were 50V, then the overload condition would occur if more than 600 mA are drawn). The powered device will avoid the occurrence of the overload condition by controlling the power level of the electrical load power based on the power control value.

In a further embodiment of the powered device, the powered device is assigned to a power class and is further arranged to indicate the assigned power class to the power providing device of the power distribution system. As an example, the device could be a PoE Class 3 device (mid-power, the device then uses power in the range of 6.49 to 12.95 Watts). The assigned power class corresponds to a predetermined first power limit and a predetermined second power limit, the predetermined first power limit relating to a maximum power that the powered device may consume and the predetermined second power limit relating to a maximum power that the power providing device of the power distribution system may provide. Continuing the example, class 3 of the PoE standard requires that a minimum of 15.4 Watts of power is provided by the power providing device. The standard further defines that the average power input for a class 3 powered device is 13.0 Watts with a peak power of 14.4 Watts. The overload condition at the power providing device occurs when the power provided over the power output interface of the power providing device corresponds to the predetermined second power limit. The electrical load power providing unit is arranged for controlling the power level of the electrical load power such that the power consumed by the powered device is above the predetermined first power limit and the power provided by the power providing device is equal to or below the predetermined second power limit. This is beneficial as it allows the powered device to consume more power than what the limit of a standard taking into account (cable) losses, such as the PoE standard, provides for, yet remain below the limit that the power providing device can provide The electrical load power providing unit of the powered device is arranged to avoid the occurrence of the overload condition at the power providing device by controlling the power level of the electrical load power based on the power control value. Again continuing the example, when the electrical load power providing device has estimated the voltage injected by the power providing device and knows, based on the class the powered device is assigned to, what the maximum power available is, then the maximum current can be determined. The power control value can then be set to this maximum current and the electrical load power providing unit can control the power level of the electrical load power in such a way that the powered device does not draw a current larger than the determined maximum current.

In yet another an embodiment of the powered device, the electrical load power providing unit is arranged for determining the power control value based on the output voltage of the power provided over the power output interface by the power providing device of the power distribution system.

In a particularly advantageous embodiment of the powered device, the powered device is further arranged for operating in a first or a second mode. In the first mode, the electrical load power providing unit is arranged for determining the power control value based on the output voltage of the power provided over the power output interface by the power providing device of the power distribution system. In the second mode, the electrical load power providing unit is arranged for determining the power control value based on a predetermined current limit. This allows the powered device to operate with a power providing device following a lower bound template as well as a power providing device following an upper bound template. A power providing device following a lower bound template injects no more than a maximum amount of power and as such the maximum current that can be drawn by the powered device depends on the voltage of the power injected by the power providing device. A power providing device following an upper bound template supports a predetermined current no matter what voltage is injected by the power providing device (within a voltage range provided by a standard, such as the PoE standard).

In an embodiment of the powered device, the power control value is determined by the electrical power providing unit of the powered device measuring the voltage over the power input interface when the power consumed by the powered device decreases over time and/or when the power consumed by the powered device is substantially zero. The difference between the voltage injected by the power providing device and the voltage received by the powered device is caused by the electrical conductor (and possibly any components, such as a diode bridge, if present in the transmission channel from powered providing device to powered device). The resistive voltage drop is directly affected by the current drawn over the electrical conductor. As the current drawn by the powered device drops, the voltage received at the powered device increases and approaches the voltage injected by the power providing device as the current reaches (substantially) zero. This allows for easy determination of the voltage at which the power providing device provides the power over the power output interface.

In a further embodiment of the powered device, the electrical load power providing unit is further arranged to control the power level of the electrical load in order to decrease the power consumed by the powered device and/or substantially cease the consumption of power by the powered device. This allows the electrical load power providing unit to create a situation in which the voltage received at the powered device side of the electrical conductor to approach the voltage injected by the power providing device.

In another embodiment of the powered device, the electrical load power providing unit is further arranged to disconnect the electrical load from the power input interface in order to substantially cease the consumption of power by the powered device. This allows for the resistive voltage drop to approach zero and the voltage to be measured at the side of the powered device to approach the voltage injected by the power providing device. In yet another embodiment of the powered device, the electrical load proving unit or the load comprises a capacitor arranged for storing electrical energy and for providing electrical energy when the electrical load power providing unit disconnects the electrical load from the power input interface. The electrical load power providing unit can then disconnect the load from the power providing device such that the received voltage can be measured, while the load is still provided with (full or partial) power allowing, for example, continued operation during the time the load is disconnected.

In an embodiment of the powered device, the power control value is determined by measuring the resistance of at least the electrical conductor and measuring the current consumed by the powered device. By determining the channel resistance through the power provided by the power providing device, the voltage injected by the power providing device can be determined. In a further embodiment of the powered device, the resistance of at least the electrical conductor is determined by taking a first measurement of the voltage and current over the power input interface, when a first current is consumed by the powered device and a second measurement of the voltage and current over the power input interface, when a second current is consumed by the powered device different from the first current. The resistance of at least the electrical conductor is then determined by the difference between the measured voltages divided by the difference between the measured currents. If there are other resistive elements that need to be taken into account, such as a diode bridge in the powered device, then those resistances are known and can be subtracted from the determined resistance. The voltage injected by the power providing device is the voltage measures on the side of the powered device combined with the voltage drop over the electrical conductor, the latter of which can now be calculated by multiplying the determined resistance with the current drawn by the powered device.

In a further embodiment, the current difference between the first current and the second current can be induced by a test current generator. A small test pulse, for example 10 mA, can be applied where the received voltage is measured before the test current pulse is generated and then again when the test current pulse is generated. Although the current drawn for this purpose can be an actual pulse, the test current could also take on a different shape (e.g. triangular, trapezoidal or sinusoidal). This could be beneficial as the influence is minimized of inductive components in the current path between the power output interface of the power providing device and the location in the electrical circuit of the powered device where the received voltage is measured.

In another embodiment of the powered device, the powered device is further arranged to communicate with the power providing device of the power distribution system. In a PoE system, the communication can be performed over the Ethernet cable connecting the PSE and the PD. The powered device could use any one of a variety of protocols, such as the Link Layer Discovery Protocol for Media Endpoint Devices (LLDP-MED) or the Simple Network Management Protocol (SNMP). The power control value is determined by the powered device receiving from the power providing device a value based on the output voltage of the power provided over the power output interface by the power providing device. The communication can comprise the powered device requesting the power providing device to communicate the value of the voltage injected by the power providing device. For a power providing device following an upper bound template, the request can comprise the powered device requesting the power providing device to communicate the value of the maximum current that the power providing device will support (e.g. the maximum current after which an overload current is detected and the power providing device disconnects the powered device).

In a further aspect of the present invention, a power distribution system is presented, wherein the system comprises the powered device, a power providing device for providing to the powered device over a power output interface a power at an output voltage, and an electrical conductor for transmitting the power between the power providing device and the powered device. In an embodiment of the power distribution system, the power distribution system is a Power-over-Ethernet system. The power providing device can then be a PoE standard (e.g. 802.3at) compliant PSE and the powered device can be a PoE standard compliant PD. The electrical conductor used can be an Ethernet cable (e.g. a Category 5 cable).

In a further aspect of the present invention, a method for providing an electrical load power to an electrical load of a powered device, within a power distribution system is presented. The method comprises: determining, by the electrical load power providing unit of the powered device, a power control value based on a characteristic of the power provided over the power output interface by the power providing device of the power distribution system; and providing, by the electrical load power providing unit of the powered device, a power level to the electrical load based on the power control value.

In a further aspect of the present invention, a computer program for providing an electrical load power to an electrical load of a powered device when the powered device is used in a power distribution system is presented.

The powered device can be any electrical consumer, but in particular the powered device can be a luminaire with or without a sensor and/or controller. Such a luminaire can comprise Light Emitting Diode (LED) light sources or other solid state light sources. In a PoE system, luminaires can be provided with both power and connectivity over an Ethernet cable (although is it also possible to us the Ethernet cable only for the provision of power).

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
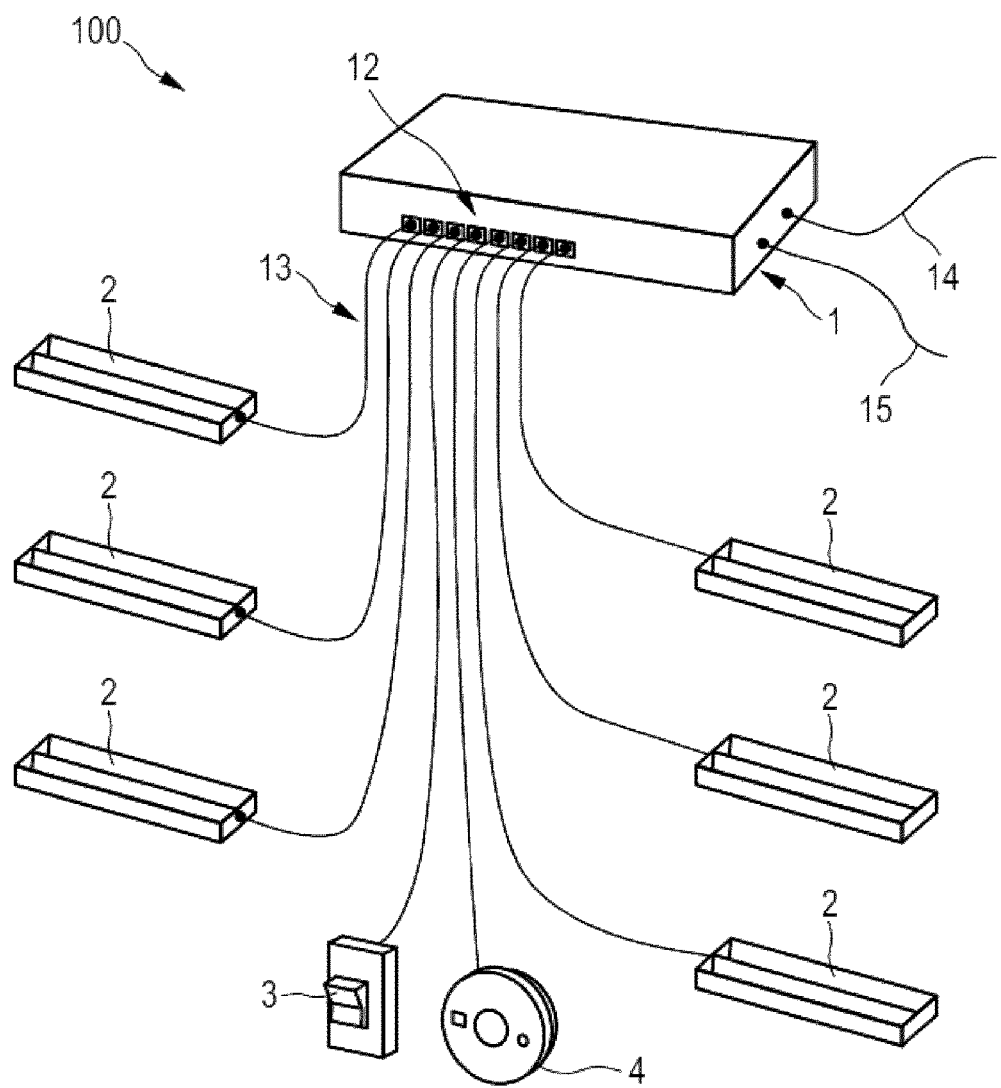
FIG. 1 shows schematically and exemplarily an embodiment of a power distribution system.
Figure 2:
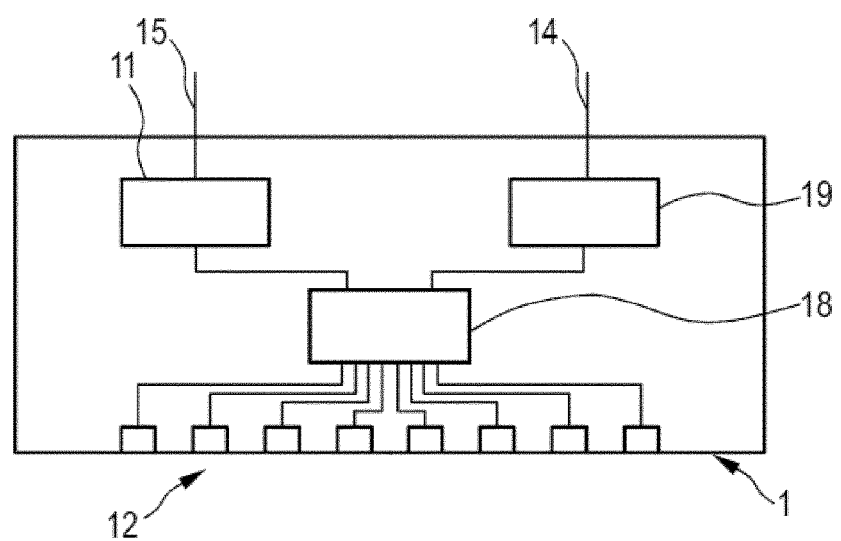
FIG. 2 shows schematically and exemplarily an embodiment of a power providing device of the system shown in FIG. 1.

FIG. 1 shows schematically and exemplarily an embodiment of a power distribution system 100 comprising a power providing device 1 for providing a power to powered devices 2, 3, and 4. In this embodiment, the power distribution system 100 is a PoE system and the power providing device 1 is a switch. The power providing device 1 is schematically and exemplarily shown in more detail in FIG. 2.

The power providing device 1 comprises several ports 12 to which the powered devices 2, 3, and 4 are connected via Ethernet cables 13, which are arranged to convey the provided power along with data. The power providing device 1 receives an input power via an electrical connection 15 that may be directly connected to a mains outlet (not shown in the figure), and the data may be received from another device (not shown in the figure), e.g., another switch, via another Ethernet cable 14. From the received power, a power supply unit 11 generates the power to be provided to the powered devices 2, 3, and 5 via a power device manager 18. The data may be processed by a network data processor 19 before being sent to a respective powered device 2, 3, or 4 via the power device manager 18.

Figure 3:
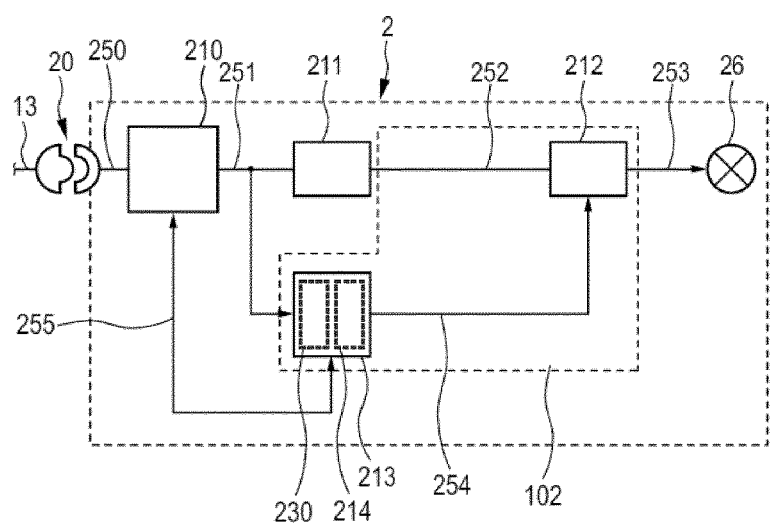
FIG. 3 shows schematically and exemplarily an embodiment of a powered device of the system shown in FIG. 1.

Here, the powered devices 2, 3, and 4 include luminaires 2, a switching element 3, and a presence sensor 4. These can be arranged such that the switching element 3 and/or the presence sensor 4 send dimming commands to the luminaires 2 via the switch 1 after the switching element 3 has been actuated by a person and/or the presence of a person has been detected by the presence sensor 4. A luminaire 2 is schematically and exemplarily shown in more detail in FIG. 3.

The luminaire 2 comprises an electrical load 26, in this embodiment, a light-emitting diode (LED). The luminaire 2 comprises an electrical load power providing unit 102 for generating from the power provided by the power providing unit 1 an electrical load power and for providing the electrical load power to the electrical load 8. According to the present invention, the electrical load power providing unit 102 is arranged for determining a power control value based on a characteristic of the power provided over the power input interface by the power providing device and control the power level of the electrical load power based on the power control value.

This will be explained in the following in more detail with reference to the PoE standard IEEE 802.3at.

The PoE standard IEEE 802.3at is a very conservative standard with a large number of safety provisions. It is designed to work in just about every conceivable way that CAT3 (Category 3), CAT5 (Category 5), and CAT6 (Category 6) cables and Ethernet are being used globally. This carries a lot of history and backwards compatibility into the standard and also allows for the support of quite "esoteric" usage scenarios. These include, e.g., compatibility with CAT3 cables (which are practically not used anymore for at least 10 years), backwards compatibility with an old AC-based disconnect detection scheme, and compatibility with crossover cables (which are practically irrelevant in end-node connections for at least 5 years).

The present invention addresses the way in which the power consumption is regulated in the PoE standard. In short, a powered device generally requires a certain power level. An input current that is drawn by the powered device from a power providing device and that is conveyed via an Ethernet cable to the powered device will cause a voltage drop and, therewith, a loss of power in the cable. The sum of the power required by the powered device and the power lost in the Ethernet cable is the power that the power providing device needs to source to the powered device.

Since Ethernet and, thus, PoE support very long cables, e.g., of up to 100 m, and since there is a wide spread in the quality and copper diameter of such cables, the PoE standard supports situations in which large amounts of power are lost in the Ethernet cables. These losses must never make a powered device unable to receive the required power, or, even worse, cause unsafe operating conditions.

The PoE standard allows for a range of voltages to be used as port voltage by the power providing device. These are listed in Table 1 below together with other important parameters regarding the power levels defined by the PoE standard IEEE 802.3at. From this table, it can be seen that the port voltage $U_{PSD}$, which must be used by the power providing device 5 is between 50V and 57V and that the powered device must be able to operate correctly with any input voltage $U_{PD}$ between 42.5V and 57V. The difference in the lower limit ($U_{PSD}$=50V vs. $U_{PD}$=42.5V) is to allow for a voltage drop in the Ethernet cable.

TABLE 1

PoE standard IEEE 802.3 at—Most important parameters regarding power levels.

| | PSD | | | Cable | PD | | |
|---|---|---|---|---|---|---|---|
| | $U_{PSD}$ (V) | $I_{PSD}$ (A) | $P_{PSD}$ (W) | $P_{reserve}$ (W) | $U_{PD}$ (V) | $I_{PD}$ (A) | $P_{PD}$ (W) |
| Max | 57 | 0.6 | 34.2 | 8.7 | 57 | 0.447 | 25.5 |
| Min | 50 | 0.6 | 30 | 4.5 | 42.5 | 0.6 | 25.5 |

Because the power providing device has no means of knowing how large the Ethernet cable losses will be, it must reserve the maximum current corresponding to the negotiated power class. For example, for power class 4, which is the highest power class defined by the PoE standard IEEE 802.3at, this is 0.6 A. The corresponding power reserve $P_{reserve}$ can then be calculated according to the following equation:

$$P_{reserve} = U_{PSD} \cdot I_{PSD} - P_{PD},$$

where $I_{PSD}$ is the maximum reserved current corresponding to the negotiated power class, and $P_{PD}$=25.5 W is the maximum power level allowed by the PoE standard to be required by the powered device (for power class 4). The necessary power reserve $P_{reserve}$ therewith amounts to 4.5 W (at $U_{PSD}$=50V) resp. 8.7 W (at $U_{PSD}$=57V) per port. This actually means that in order to be able to guarantee the provision of the maximum allowed power level of $P_{PD}$=25.5 W to the powered device, the power providing device must be able to provide a port power of $P_{PSE}$=34.2 W (assuming that 57V is selected as the port voltage $U_{PSD}$).

The inventors have realized that, in practice, the power losses occurring in the Ethernet cables are rather limited, even with long cables. Furthermore, it is very unlikely that every powered device is connected with the worst possible cable configuration. Also, it is now found that most power providing device s make use of the highest port voltage $U_{PSD}$=57V (or a slightly lower port voltage of, e.g., $U_{PSD}$=56V). Thus, in many situations it would actually be possible for a powered device to consume considerably more power than the 25.5 W allowed by the PoE standard (for power class 4). Allowing for such an increase of the power consumption of the powered device could be beneficial in a number of different applications. For example, modern PoE-based lighting applications are at the threshold of having sufficient power with today's LEDs and the 25.5 W power limit. With a slightly higher power level, more lighting applications could be enabled or a significant reduction in cost for the LEDs could be achieved.

In practice, there are several ground rules that are dictated by the PoE standard IEEE 802.3at:
1. The port voltage $U_{PSD}$ used by the power providing device must be between 50V and 57V.
2. The power providing device must reserve the maximum current $I_{PSD}$ corresponding to the negotiated power class (e.g., 0.6 A for power class 4).
3. The powered device must enforce a power consumption corresponding to (or being below) the maximum allowed power level of, e.g., $P_{PD}$=25.5 W (for power class 4).

Compliance with the first rule is guaranteed by the designer of the power providing device, who will select an appropriate power supply unit, and who will test the power providing device in different usage scenarios to make sure that under no condition a non-allowed port voltage $U_{PSD}$ is provided.

In addition, observance of the second rule is guaranteed by the port controllers of the power providing device, which continuously measure the input current drawn by the powered devices, and which will cut-off a port if the input current drawn by the powered device connected to the port exceeds the maximum current corresponding to the negotiated power class (overcurrent protection). For example, as described above, for power class 4, the maximum current is 0.6 A with the maximum power level $P_{PD}$ allowed by the PoE standard to be required by the powered device being 25.5 W.

The present invention is based on the inventors' realization that a power providing device cannot control a power providing device's compliance with the third rule and that, if the powered device was to violate the third rule, it could consume more power, provided that it keeps to the maximum current corresponding to the negotiated power class. For example, assuming that a port voltage $U_{PSD}$=57V is used by the power providing device and that the voltage drop occurring in the Ethernet cable is more or less negligible— which is indeed roughly the case with modern cables of common length—, the maximum power level that could be consumed by the powered device is as high as 34.2 W (see again Table 1).

Now, it has further been realized by the inventors that if a powered device would simply consume more power, the ease of installation associated with modern PoE equipment would be lost, because it would be necessary to define which power providing devices are supported by the powered device (which would depend on the port voltage $U_{PSD}$ used by the power providing device) and which Ethernet cable types and lengths can be used (which would depend on the voltage drop occurring in the cables). In contrast, the present invention is based on the idea that it would be advantageous if a powered device would be able to automatically consume the maximum power level that can be consumed without causing the overcurrent protection mechanism of the power providing device to trip. This should preferentially work automatically and never cause a powered device not to work where another device that complies with the PoE standard IEEE 802.3at would work. In this manner, a powered device could optimize its power consumption in a way that would be compatible to the PoE standard IEEE 802.3at.

Returning now to FIG. 3, the Ethernet cable 13 is connected to a jack 20 of the luminaire 2. The conveyed power along with the data is provided to a power-data splitter 210 via a power-data path 250. The power-data splitter 210 splits the power and the data conveyed by the Ethernet cable 13. The split data is then conveyed further via the data path 255 and the split power is conveyed further via the power path 251. The power-data splitter 210 comprises, e.g., a magnetic circuit for splitting the power and data signals.

The luminaire 2 further comprises a powered device controller 211 for identifying the luminaire 2 in the PoE system and for negotiating a power class with the switch 1. The electrical load power providing unit 102 comprises an electrical load driver 212 for generating from the power provided by the power providing device 1, which is received by the electrical load driver 212 via the powered device controller 211, an electrical load power and for providing the electrical load power to the LED 26, and an electrical load power controller 213 for determining the power level of the electrical load power.

The electrical load power providing unit is arranged for determining a power control value based on a characteristic of the power provided over the power output interface (e.g one of the ports 12) of the power providing device 1. The electrical load power providing unit will then control the power level of the electrical load power based on the power control value. This power control value can be a current limit, where this current limit is determined by estimating the voltage injected by the power providing device. Given, for example, the minimum power the power providing device needs to provide, the maximum current that can be drawn given the estimated voltage injected can be determined. This will now be explained in more detail given some examples of determination methods, although other methods could also be applied.

The electrical load power providing unit can, for example, modulate the power consumption of the load and therefore the powered device for measurement of the voltage received. The difference between the voltage injected by the power providing device and the voltage received by the powered device is caused by voltage drop over at least the electrical conductor. Also, pulse transformers resistances and input diodes in the powered device bridge rectifiers can have an effect. The resistive voltage drop is directly affected by the current drawn over the cable. The powered device can minimize its current consumption for a short period of time, causing the voltage received at the powered device to increase, approaching the value of the voltage injected by the power providing device as due to the very low current being transmitted over the cable, the resistive voltage of the cable becomes very low.

Although the load at some point in time might draw little or no current, the measurement can also be taken after the current flow has been purposefully dropped. This can easily be done by shortly deactivating an isolation switch as can typically be found in a powered device controller. Optionally, the load will be supplied for this short period of time from a load in a buffer capacitor. While observing the voltage rise after the rectifiers, allows determining when the voltage at (substantially) zero current stabilizes. The voltage can then be measured and this is a very good estimate of the voltage injected by the power providing device. The isolation switch can then be activated again. Another option is to switch off the load of the powered device (e.g. by disabling a voltage converter or by means of a separate deactivation switch).

Although in the powered device the voltage can be measured at the physical interface of the powered device, it is also possible and easier to measure it after the powered device hot swap. The powered device can correct for any known voltage drop over the hot swap FET and the rectifier (e.g. the diodes or active rectifier).

The powered device can measure the received voltage during the low power consumption period to estimate the value of the power injected by the power providing device. It can then calculate the maximum current supported by the power providing device and can increase power consumption.

In a different embodiment the voltage at PSE side is not directly measured. For this embodiment the sum of resistances between the power output of the power providing device and the power input of the powered device is determined. This is done by means of measuring the voltage at the powered device and synchronously measuring the current. Each small change in the current will cause also a (small) change in the voltage due to the linearly dependent voltage drop. For both differences the resistance can be estimated. In an example, assume that V1 is measured at current I1 and V2 is measured at I2 then the resistance is calculated as follows: (V1−V2)/(I1−I2). Knowing the sources for the voltage drop (e.g. the determined sum of resistances and any known resistances in the powered device or a diode bridge forward voltage) and the total current consumed by the powered device, the voltage inected by the power providing device can be calculated as follows: voltage received at the power providing device+(determined resistance*current drawn by the powered device).

In another embodiment the current changes as used above are inserted by a dedicated test current injector. This could be for example a short current pulse of 10 mA that increases the power drawn from the power providing device. In the calculation of the resistance explained above, the difference between I1 and I2 is then fixed at 10 mA. The voltage received at the powered device is measured as V1 before the test pulse starts and measured again when test current is applied to determine V2. As most of the voltage drop is resistive the voltage will directly (or with negligible delay) follow the current and can be measured after a short delay say 10 ms. After that the test current can be removed again. This embodiment is beneficial as no precision current measurement needs to be carried out in the PD. In other embodiments the test current may not be a true pulse but can be triangular, trapezoidal or sinusoidal shape. This can reduce the influence of inductive components on the measurement.

The electrical load powering device can send a power control signal being indicative of the determined power level via a control signal path 254 to the electrical load driver 212. The electrical load driver 212 is arranged to generate from the provided power the electrical load power in accordance with the power control signal received from the electrical load power controller 213. The electrical load power is provided from the electrical load driver 212 to the LED 26 via an electrical load power path 253. The electrical load driver 212 is arranged to generate the electrical load power by generating a corresponding electrical load driving current for driving the LED 26. The electrical load power providing unit 102, in particular, the electrical load power controller 213 or the electrical load driver 212 may be arranged to low pass filter the control signal.

Figure 4:
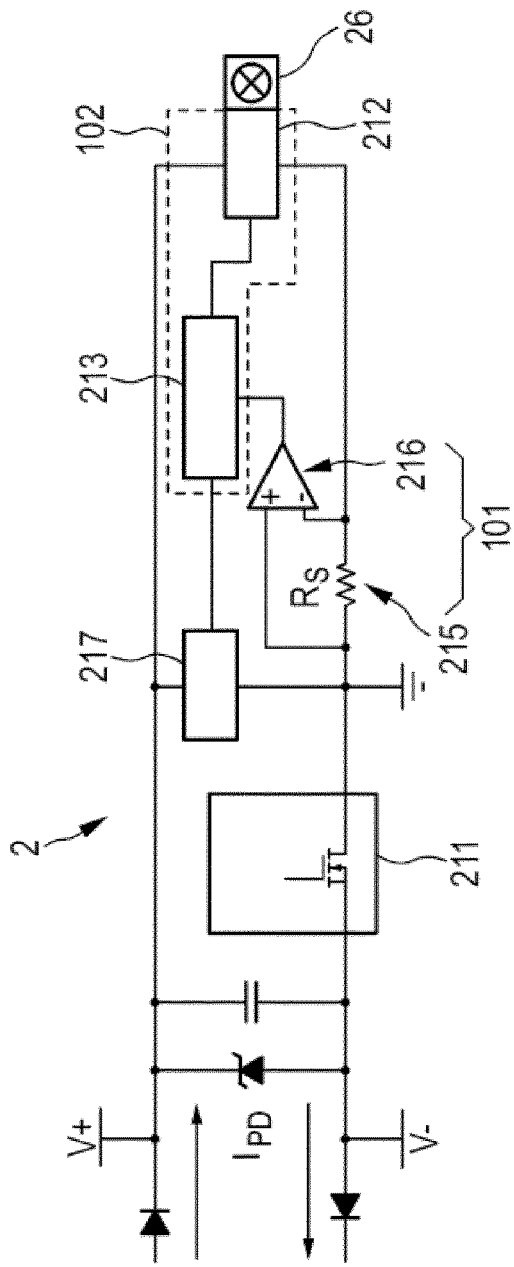
FIG. 4 shows schematically and exemplarily an embodiment of a powered device comprising a current determining unit.
Figure 5:
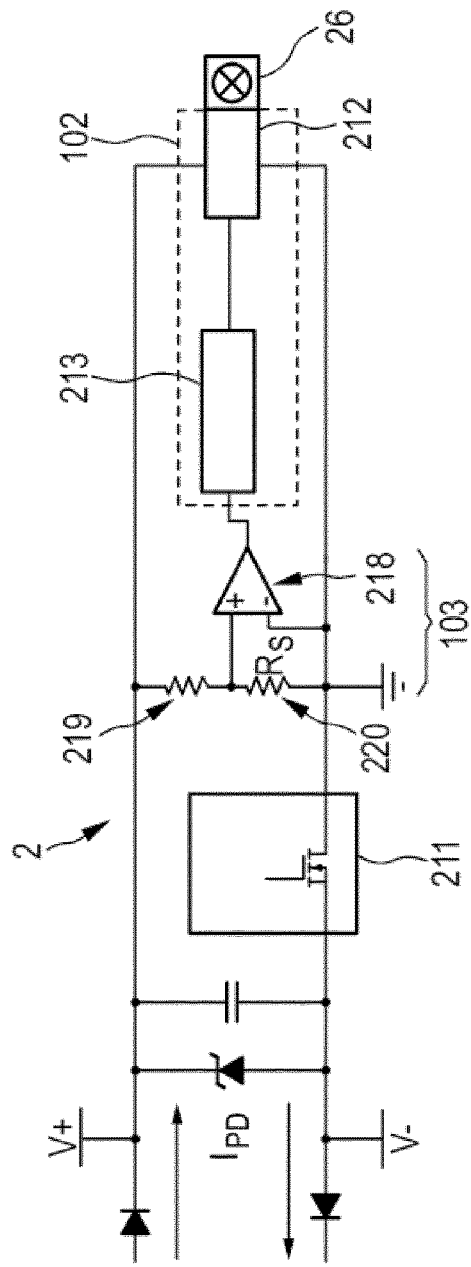
FIG. 5 shows schematically and exemplarily an embodiment of a powered device comprising a voltage determining unit.

The powered device, such as the luminaire 2, can comprise a current determining unit 101 (not shown in FIG. 3) for determining a current flowing in the luminaire 2. According to FIG. 4, the current determining unit 101 is arranged to determine the current using a low side current sense which measures the return current from the electrical load driver 212. As the power consumption of the electrical load power controller 213 itself is generally known, the total amount of the input current drawn by the powered device 2 from the power providing device 1 can be calculated and the electrical load power providing unit 102 can thus generate the electrical load power with a power level such that the drawn input current is maximized according to the power control value (e.g. a maximum current that can be drawn). The powered device may also comprise a voltage determining unit, as shown in FIG. 5 (not shown in FIG. 3) for determining a voltage present in the luminaire 2.

In another embodiment, it may also be possible to directly measure the current flowing in the electrical load 26, which, in turn, allows to calculate the power level of the electrical load power, which, in turn, allows to estimate the power drawn from the power providing device 1, which, in turn, allows to determine the input current drawn from the power providing device 1 when the voltage present at the electrical load power providing unit 102 is known, e.g., when it is determined as described as above.

Figure 6:
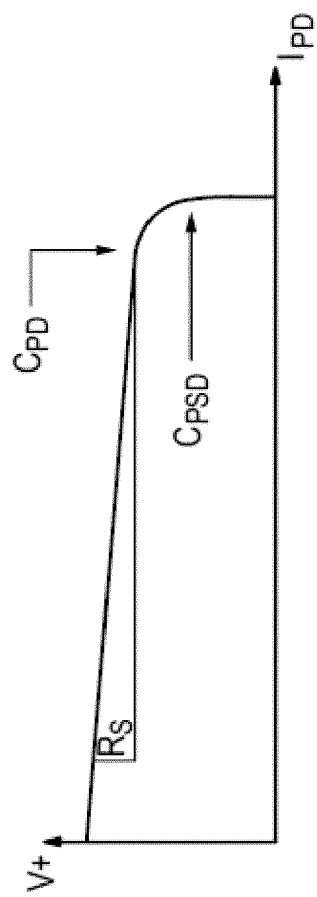
FIG. 6 shows schematically and exemplarily a relationship between an input current drawn by a powered device and a voltage at a powered device.

FIG. 6 illustrates that as the current drawn by the powered device increases, the voltage that is received at a powered device drops. This is determined by the source impedance $R_S$ which relates to, for example, the electrical conductor such as the Ethernet cable used. Also shown is that when the input current $I_{PD}$ approaches an overcurrent situation, the power providing device may reduce the voltage injected to protect from an overcurrent.

Returning to FIG. 3, in another embodiment, the luminaire 2 comprises a communication unit 230 (shown in FIG. 3 exemplarily as an element of the electrical load power controller 213) for communicating with the power providing device 1 via the electrical conductor 13, wherein the communication unit 230 is arranged to request from the power providing device 1 information about the voltage injected or the maximum current that can be drawn. This communication may be performed using protocols such as CDP (Cisco Discovery Protocol), LLDP-MED (Logical Link Device Protocol-for Media Endpoint Devices) or SNMP (Simple Network Management Protocol).

Figure 7:
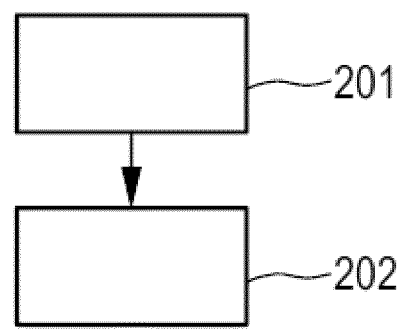
FIG. 7 shows a flowchart exemplarily illustrating an embodiment of a method for providing an electrical load power to an electrical load of a powered device within a power distribution system.

In the following, an embodiment of a method for providing an electrical load power to an electrical load 26 of a powered device 2 within a power distribution system 100 will exemplarily be described with reference to a flowchart shown in FIG. 7.

During providing of a power to the powered device 2 by a power providing device 1 of the system 100, in step 201 the electrical load power providing unit determines a power control value based on a characteristic of the power provided over the power output interface of the power providing device; and in step 202 the electrical load power providing unit provides a power level of the electrical load power based on the power control value.

Figure 8:
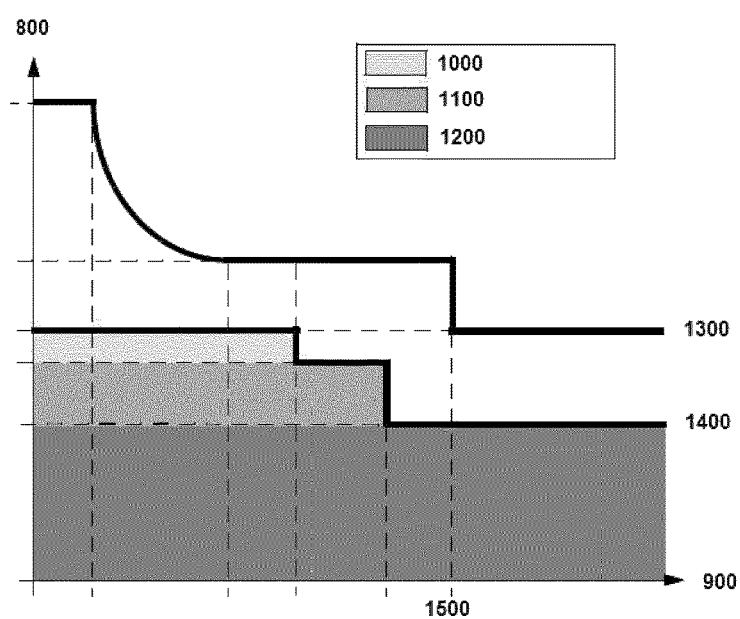
FIG. 8 shows schematically and exemplarily a plot of the minimum and maximum currents supported by a power providing device compliant with the PoE standard.

In FIG. 8 the lower bound template and upper bound template that a power providing device, in this case a PoE compliant PSE, can follow are illustrated. The vertical axis 800 is the current drawn from the PSE. The horizontal axis 900 is a time scale. The three shades of grey indicate the short circuit range 1000, the overload range 1100 and the normal operating range 1200. The figure illustrates that a PSE should supply a current between a maximum current 1300 and a minimum current 1400, both at least as high as the normal operating range for a predetermined period in order to comply with the standard. After a predetermined period 1500, the PSE will support a maximum amount of power being drawn. If a PSE follows the lower bound template, then the maximum power provided is the minimum power as required by the standard and the maximum current supported by the PSE will depend on the voltage injected by the PSE. If the PSE follows the upper bound template, then the maximum power provided is based on a predetermined maximum current and the maximum power provided is dependent on the voltage injected by the PSE.

Although in the embodiments described above with reference to FIG. 3 the electrical load power controller 213 determines the power level of the electrical load power, in other embodiments also other components of the powered device can provide this function. For instance, this power level control can be implemented in the powered device controller 211, which may already comprise suitable analog circuitry. For providing the power level setting function the respective component of the powered device can use a microcontroller or another kind of controller.

The electrical load power providing unit of the powered device can be used to seamlessly extend the PoE standard IEEE 802.3at and/or the PoE standard IEEE 802.3af in order to boost the maximum power level of powered devices. For example, as described above, assuming that a port voltage $U_{PSD}$=57V is used by a power providing device and that the voltage drop occurring in the Ethernet cable is more or less negligible, the maximum power level that can be consumed by a powered device by extending the PoE standard IEEE 802.3at is as high as 34.2 W (see again Table 1) when the drawn input current is maximized. It is, however, to be noted that the present invention is not limited to one or more of the above PoE standards, but may advantageously also be used within other power distribution systems that have similar characteristics.

Although in above described embodiments certain powered devices like luminaires, presence sensors, switching elements, et cetera have been described, in other embodiments the powered devices can also include other electrical devices like fans, user interfaces such as displays or switch panels, et cetera.

Although in the embodiment described above with reference to FIG. 3 the jack 20 and the power-data splitter 210 are separate components, in another embodiment the power-data splitter 210 may be integrated into the jack 20.

Although in the embodiment described above with reference to FIG. 3 the electrical load 26 comprised by the luminaire 2 is a light-emitting diode (LED), in another embodiment the electrical load 26 may be an organic light-emitting diode (OLED), a laser, a halogen lamp or the like.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Determinations like the determination of the power level of the electrical load power, the negotiation procedures, et cetera performed by one or several units or devices can be performed by any other number of units or devices. The procedures and/or the control of the powered device in accordance with the method for providing an electrical load power to an electrical load of the powered device within the power distribution system can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a powered device like a luminaire for being used in a power distribution system, which is preferentially a PoE system and which comprises a power providing device for providing a power to the powered device. The powered device comprises an electrical load like an LED and an electrical load power providing unit for generating from the provided power an electrical load power and for providing the electrical load power to the electrical load, wherein the electrical load power providing unit is arranged to generate the electrical load power with a power level such that an input current drawn by the powered device from the power providing device is maximized below a predefined upper input current threshold. This allows increasing the power consumption of the powered device in comparison to the power consumption of powered devices in accordance with the PoE standard IEEE 802.3at.

The invention claimed is:

1. A powered device for being used in a power distribution system, the power distribution system comprising:
   a power providing device for providing a power at an output voltage to the powered device over a power output interface and for monitoring said power for occurrence of an overload condition, which occurs when said power corresponds to a predetermined second power limit, and
   an electrical conductor for transmitting the power between the power providing device and the powered device;
   wherein the powered device is assigned to a power class corresponding to a predetermined first power limit and the predetermined second power limit, the predetermined first power limit relating to a maximum power that the powered device may consume and the predetermined second power limit relating to a maximum power that the power providing device of the power distribution system may provide; and wherein the powered device is arranged to indicate the assigned power class to the power providing device;
   the powered device comprising:
   a power input interface for receiving the power,
   an electrical load, and
   an electrical load power providing unit for transforming the power received over the power input interface into an electrical load power and for providing the electrical load power to the electrical load,
   wherein the electrical load power providing unit is arranged for determining a current limit as a power control value based on the output voltage of the power provided over the power output interface by the power providing device of the power distribution system, and
   wherein the electrical load power providing unit is further arranged to control the power level of the electrical load power based on the power control value to avoid the occurrence of the overload condition at the power providing device, such that the power consumed by the powered device is above the predetermined first power limit and the power provided by the power providing device is equal to or below, the predetermined second power limit.

2. The powered device according to any of claim 1, wherein the power control value is determined by measuring the voltage over the power input interface when the power consumed by the powered device decreases over time and/or when the power consumed by the powered device is substantially zero.

3. The powered device according to claim 2, wherein the electrical load power providing unit is further arranged to control the power level of the electrical load in order to decrease the power consumed by the powered device and/or substantially cease the consumption of power by the powered device.

4. The powered device according to claim 3, wherein the electrical load power providing unit is further arranged to disconnect the electrical load from the power input interface in order to substantially cease the consumption of power by the powered device.

5. The powered device according to claim 1, wherein the power control value is determined by measuring the resistance of at least the electrical conductor and measuring the current consumed by the powered device.

6. The powered device according to claim 5, wherein the resistance of at least the electrical conductor is determined by taking a first measurement of the voltage and current over the power input interface, when a first current is consumed by the powered device and a second measurement of the voltage and current over the power input interface, when a second current is consumed by the powered device different from the first current.

7. The powered device according to any of claim 1, wherein the powered device is further arranged to communicate with the power providing device of the power distribution system, and
   wherein the power control value is determined by the powered device receiving from the power providing device a value based on the output voltage of the power provided over the power output interface by the power providing device.

8. A power distribution system comprising the powered device of claim 1 and further comprising:
   a power providing device for providing to the powered device over a power output interface a power at an output voltage, and
   an electrical conductor for transmitting the power between the power providing device and the powered device.

9. The power distribution system according to claim 7, wherein the power distribution system is a Power-over-Ethernet system.

10. A method for providing an electrical load power to an electrical load of a powered device according to claim 1, within a power distribution system, wherein the method comprises:
    determining, by the electrical load power providing unit of the powered device, a current limit as a power control value based on the output voltage of the power provided over the power output interface by the power providing device of the power distribution system, and
    providing, by the electrical load power providing unit of the powered device, a power level to the electrical load based on the power control value to avoid the occurrence of the overload condition at the power providing device,
    wherein the electrical load power providing unit is arranged for controlling the power level of the electrical load power such that the power consumed by the powered device is above the predetermined first power limit and the power provided by the power providing device is equal to or below the predetermined second power limit.

11. A non-transitory computer readable medium containing a computer program product for providing an electrical load power to an electrical load of a powered device according to claim 1.

* * * * *